United States Patent [19]

Sugiyama et al.

[11] Patent Number: 5,585,983
[45] Date of Patent: Dec. 17, 1996

[54] MAGNETIC HEAD

[75] Inventors: Yasunari Sugiyama, Tokyo; Hiroyuki Ohmori; Kasuhiko Hayashi, both of Kanagawa; Masatoshi Hayakawa, Miyagi, all of Japan

[73] Assignee: Sony Corporation, Tokyo, Japan

[21] Appl. No.: 747,849

[22] Filed: Aug. 20, 1991

[30] Foreign Application Priority Data

Aug. 21, 1990 [JP] Japan .................................. 2-219828

[51] Int. Cl.$^6$ ..................................................... G11B 5/02
[52] U.S. Cl. ................................................ 360/113; 360/110
[58] Field of Search ..................................... 360/110, 113

[56] References Cited

U.S. PATENT DOCUMENTS

| 4,593,332 | 6/1986 | Akiyama et al. | 360/110 |
| 4,609,950 | 9/1986 | Chiba et al. | 360/110 |

FOREIGN PATENT DOCUMENTS

| 0154307 | 9/1985 | European Pat. Off. . |
| 0326741 | 8/1989 | European Pat. Off. . |
| 2037474 | 7/1980 | United Kingdom . |

Primary Examiner—Craig E. Church
Attorney, Agent, or Firm—Hill, Steadman & Simpson

[57] ABSTRACT

A magnetic head comprises a substrate, a soft magnetic thin film, whose magnetic permeability varies according to the intensity of an external magnetic field applied thereto, formed over the surface of the substrate, means for supplying a high-frequency current to the soft magnetic thin film, and means for applying a bias magnetic field to the soft magnetic thin film. The magnetic permeability of the soft magnetic thin film varies according to the variation of the intensity of the external magnetic field and hence the potential difference between the opposite ends of the soft magnetic thin film with respect to the direction of flow of the high-frequency current varies accordingly. The variation of the potential difference is detected for magnetic signal reading. The soft magnetic thin film is formed of a material having a large magnetic permeability, such as amorphous $CO_{75}Ta_{11}Zr_{14}$.

12 Claims, 6 Drawing Sheets

MAGNETIC HEAD

BACKGROUND OF THE INVENTION

1. Field of the Invention

The present invention relates to a magnetic head and, more particularly, to a magnetic head based on a principle different from those on which conventional magnetic heads are based.

2. Description of the Prior Art

A magnetic head utilizing a magnetoresistance effect (hereinafter referred to a "MR head"), the performance of which is not affected by its relative speed with respect to the magnetic recording medium, has been developed to deal with high-density magnetic recording. A known MR head employs a Permalloy thin film.

A technique relating to another type of head, disclosed in Thirteenth Nippon Oyo Jiki Gakkai Gakujutsu Koen Gaiyo-shu, p.214 (1989) measures the variation of the high-frequency resistance of amorphous metal thin wires caused by an external magnetic field. An active head utilizing the variation of the inductance of a coil caused by an external magnetic field, which is superior to the MR head, has recently been proposed in 1990 Denshi Joho Tsushin Gakkai Shunki Zenkoku Taikai Koen Yoko-shu 5-3. p.5.

The sensitivity of the known MR head employing a Permalloy thin film is not high enough, because the resistance change ratio $\Delta R/R$ of the Permalloy thin film due to magnetoresistance effect is on the order of 2%.

SUMMARY OF THE INVENTION

Accordingly, it is an object of the present invention to provide a magnetic head capable of reading magnetic signals from a magnetic recording medium at a high sensitivity.

In one aspect of the present invention, a magnetic head comprises a soft magnetic thin film whose magnetic permeability varies according to the variation of an external magnetic field, current supply means for supplying a high-frequency current to the soft magnetic thin film, and biasing means for applying a bias magnetic field to the soft magnetic thin film. A high-frequency current is supplied to the soft magnetic thin film while a bias magnetic field is applied to the same, and the variation of the potential difference between the opposite ends of the soft magnetic thin film with respect to the direction of flow of the high-frequency current is measured for reading magnetically recorded signals at a high sensitivity.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

A principle on which the present invention is based will be described with reference to FIG. 1 prior to the description of a magnetic head embodying a preferred embodiment of the present invention.

Figure 1:
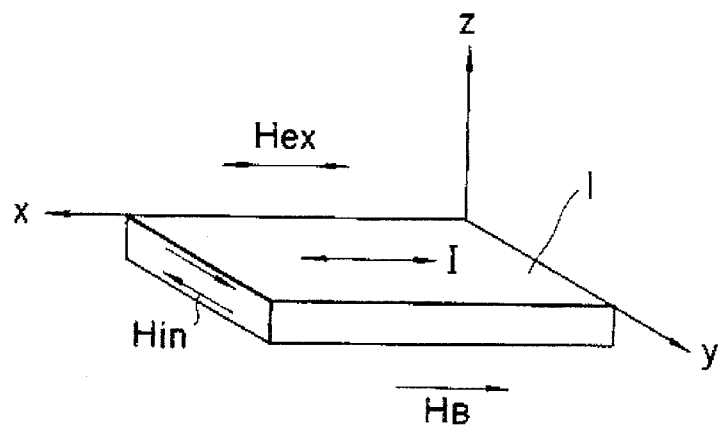
FIG. 1 is a perspective view of assistance in explaining a principle on which the present invention is based.

Referring to FIG. 1, a high-frequency current I is supplied to a rectangular soft magnetic thin film 1 in the longitudinal direction of the soft magnetic thin film 1, namely, a direction along the x-axis, while a bias magnetic field HB is applied to the same. The impedance of the soft magnetic thin film 1 is expressed by: $Z=R+j\omega L$, where Z is the impedance, R and L are the resistance and inductance, respectively, of the soft magnetic thin film, and $\omega$ is the angular frequency of the high-frequency current I. The inductance L is dependent on the magnetic permeability $\mu$ of the soft magnetic thin film 1, and hence the impedance Z of the soft magnetic thin film 1 is dependent on the magnetic permeability $\mu$.

Figure 2:
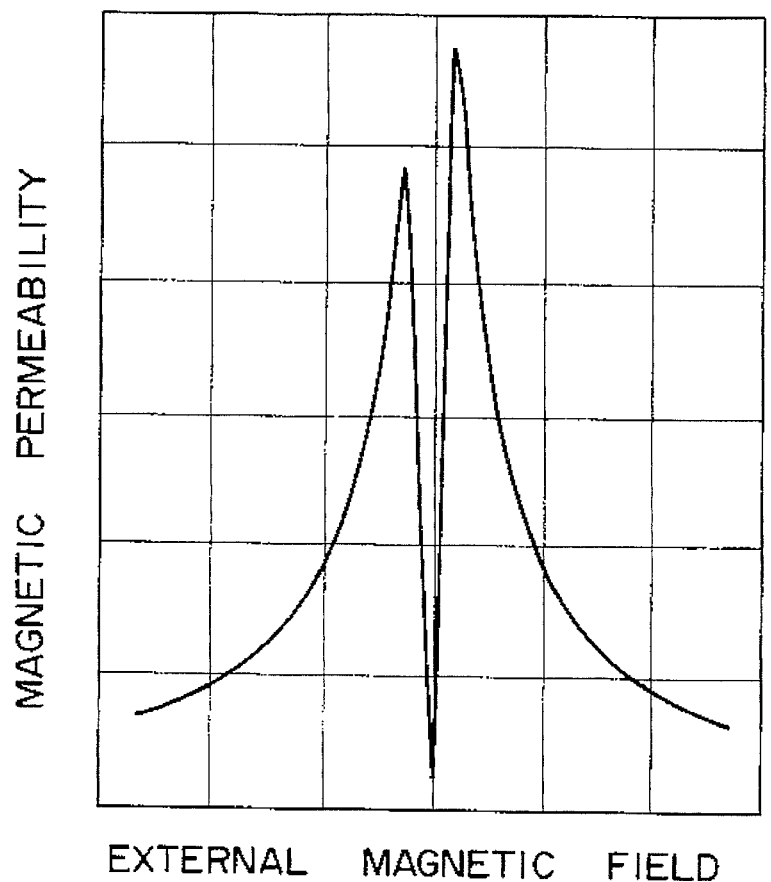
FIG. 2 is a graph showing the dependence of the magnetic permeability of a soft magnetic thin film on an external magnetic field.

Incidentally, the high-frequency current I creates a magnetic field $H_{in}$ within the soft magnetic thin film 1 in the xz-plane perpendicular to the direction of flow of the high-frequency current I. Therefore, the impedance Z is dependent on the magnetic permeability $\mu$ in the xz-plane. This magnetic permeability $\mu$ varies with an external magnetic field $H_{ex}$ along the x-axis (FIG. 2). Accordingly, the external magnetic field $H_{ex}$ can be detected through the measurement of the variation of the potential difference between the opposite ends of the soft magnetic thin film 1 with respect to the direction of flow of the high-frequency current I corresponding to the variation of the impedance Z due to the variation of the magnetic permeability $\mu$ caused by the external magnetic field $H_{ex}$.

If the external magnetic field $H_{ex}$ is created by a magnetic recording medium, magnetic data recorded in the magnetic recording medium can be read through the measurement of the variation of the potential difference between the opposite ends of the soft magnetic thin film 1. Since the impedance Z, hence the potential difference between the opposite ends of the soft magnetic thin film 1, varies greatly for a small variation of the external magnetic field if the magnetic permeability μ of the soft magnetic thin film 1 is large enough, the magnetic head employing such a soft magnetic thin film is able to read magnetic data at a high sensitivity.

A magnetic head embodying the present invention will be described hereinafter with reference to the accompanying drawings, in which like parts are denoted by the same reference characters and their duplicate description will be omitted.

Fundamental characteristics of a soft magnetic thin film employed in a magnetic head embodying the present invention will be described.

Figure 3:
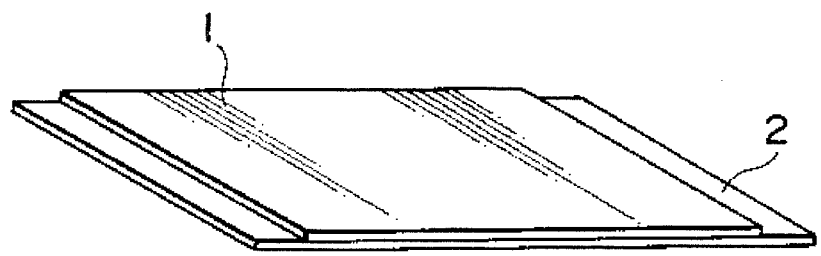
FIGS. 3 to 5 are perspective views of assistance in explaining a process of forming a soft magnetic thin film employed in a magnetic head embodying the present invention, and a method of measuring the magnetic characteristics of the soft magnetic thin film.

Referring to FIG. 3, a 1.72 μm thick soft magnetic thin film 1 of amorphous $Co_{75}Ta_{11}Zr_{14}$ was formed over a glass substrate in an argon atmosphere of $3\times10^{-3}$ by a RF sputtering process. Then, the soft magnetic thin film 1 was heated at 340° C. for thirty minutes in a rotating magnetic field of a field intensity of 1 kOe. A high-frequency magnetic field was applied to the soft magnetic thin film 1 to measure the magnetic characteristics of the same. The measured soft magnetic characteristics of the soft magnetic thin film 1 in effective permeability was 3480 for 10 MHz and 1550 for 100 MHz.

Figure 4:
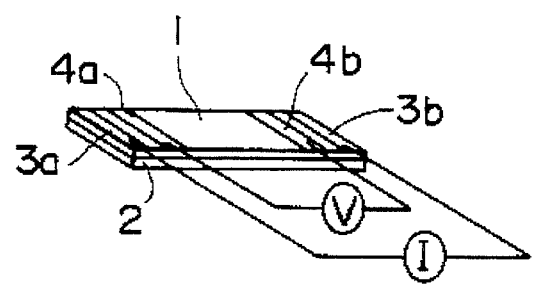
Figure 5:
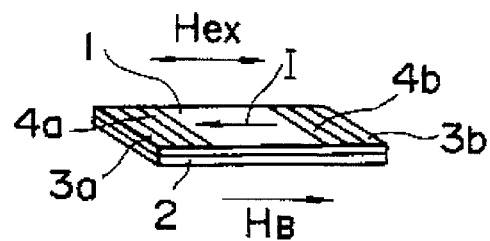
Figure 6:
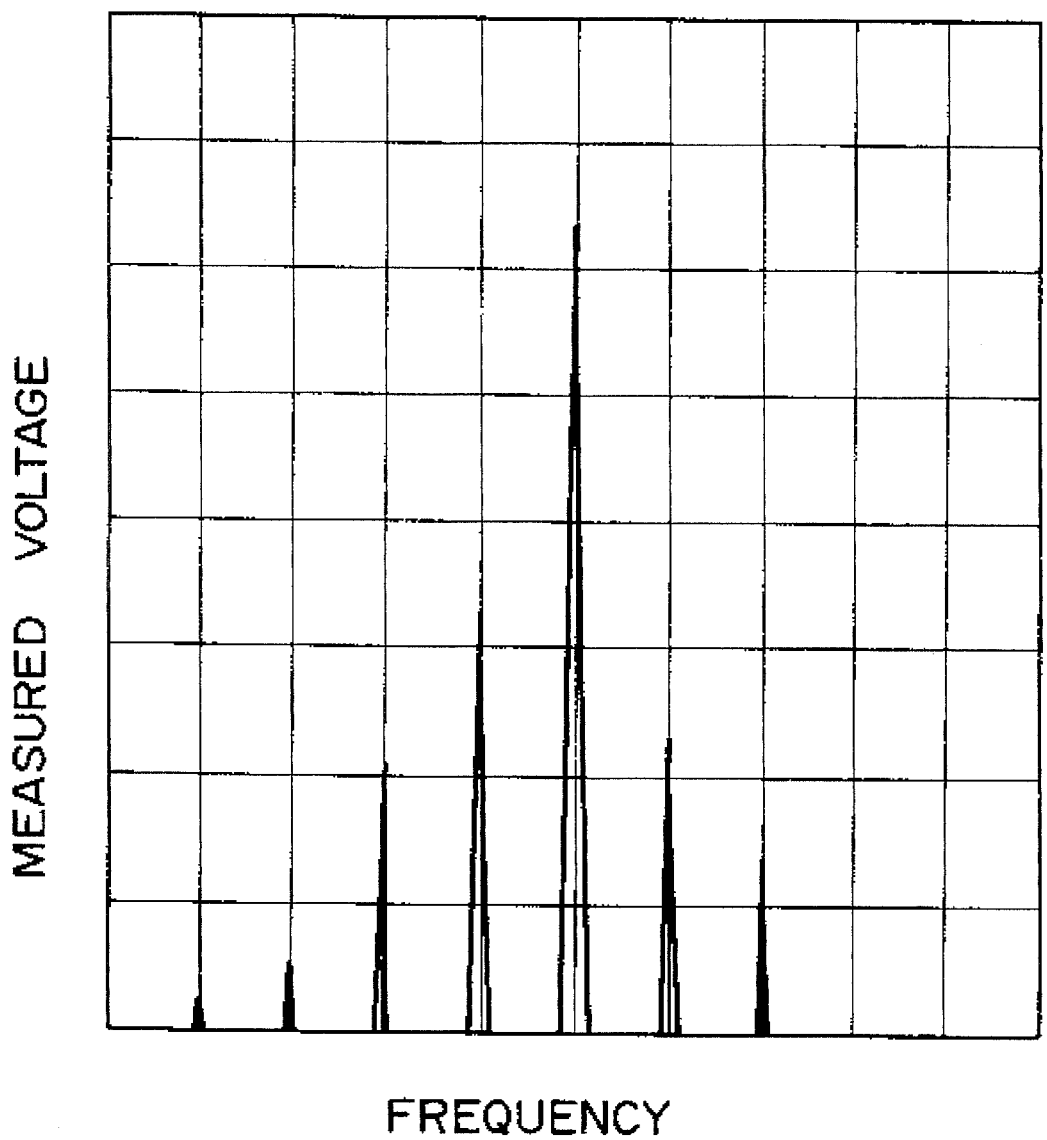
FIG. 6 is a graph showing the result of measurement of the output voltage of a soft magnetic thin film employed in a magnetic head embodying the present invention by a spectrum analyzer.

A specimen as shown in FIG. 4 was cut out from the glass substrate 2 coated with the soft magnetic thin film 1 of amorphous $CO_{75}Ta_{11}Zr_{14}$, and current terminals 3a and 3b and voltage terminals 4a and 4b were attached to the soft magnetic thin film 1 to prepare a test piece. The current terminals 3a and 3b were connected to a power supply to supply a high-frequency current I through the soft magnetic thin film 1, and a bias magnetic field HB and a high-frequency external magnetic field $H_{ex}$ of a frequency of 1 MHz and an intensity in the range of 2 to 3 mOe were applied longitudinally to the test piece. The voltage across the voltage terminals 4a and 4b was measured by a spectrum analyzer. Measured results are shown in FIG. 6, in which frequency is measured on the horizontal axis, and measured voltage is measured on the vertical axis. The center frequency is 100.1 MHz, and the rage of the frequency is 100.1±2.5 MHz. In FIG. 6, the central peak voltage corresponds to the carrier wave, and other peak voltages are for a component signal modulated by the external magnetic field $H_{ex}$ and its higher harmonic component. As is obvious from FIG. 6, the response of the component signal modulated by the external magnetic field $H_{ex}$ to the carrier wave is 10% or above.

Magnetic characteristics of a soft magnetic thin film 1 of amorphous $CO_{75}Ta_{11}Zr_{14}$ not subjected to the heat treatment were measured for comparison by the same manner. The soft magnetic thin film 1 had an effective permeability of 650 for 10 MHz and 570 for 100 MHz, which were smaller than those of the heat-treated soft magnetic thin film 1. It was confirmed through the measurement of the voltage across the voltage terminals 4a and 4b by the spectrum analyzer that the reduction of the effective permeability caused the reduction of the signal voltage.

Thus, the response of the soft magnetic thin film 1 having a sufficiently large effective permeability to the variation of the external magnetic field $H_{ex}$ in a narrow range of 2 to 3 mOe is as large as 10%.

Figure 7:
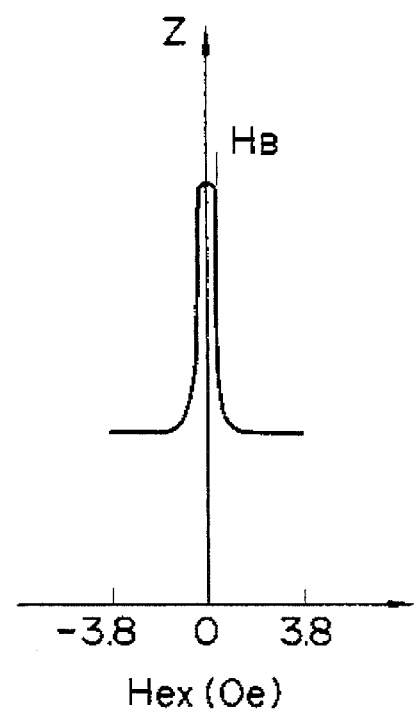
FIG. 7 is a graph showing the dependence of the impedance of a soft magnetic thin film employed in a magnetic head embodying the present invention on an external magnetic field.
Figure 8:
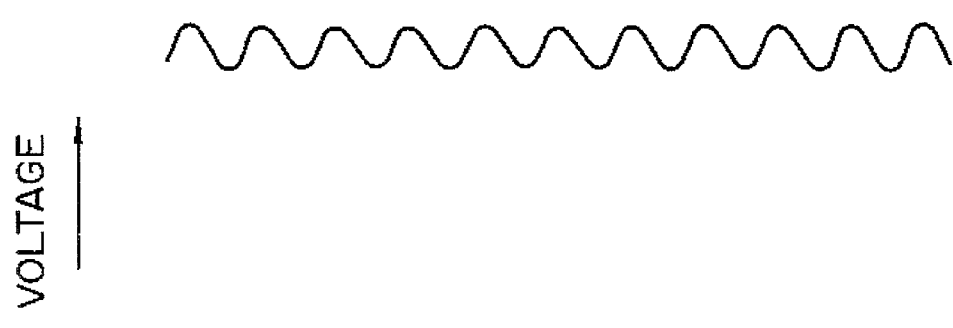
FIG. 8 is a waveform chart showing the waveform of a voltage signal provided by a soft magnetic thin film employed in a magnetic head embodying the present invention.

FIG. 7 shows the variation of the impedance Z of a soft magnetic thin film 1 of amorphous $CO_{75}Ta_{11}Zr_{14}$ with a high-frequency external magnetic field $H_{ex}$, and FIG. 8 shows the waveform of the voltage across the voltage terminals 4a and 4b, when a bias magnetic field HB of 0.4 Oe and a high-frequency external magnetic field $H_{ex}$ of 0.1 Oe and 1 MHz were applied to the test piece shown in FIG. 4.

Figure 9:
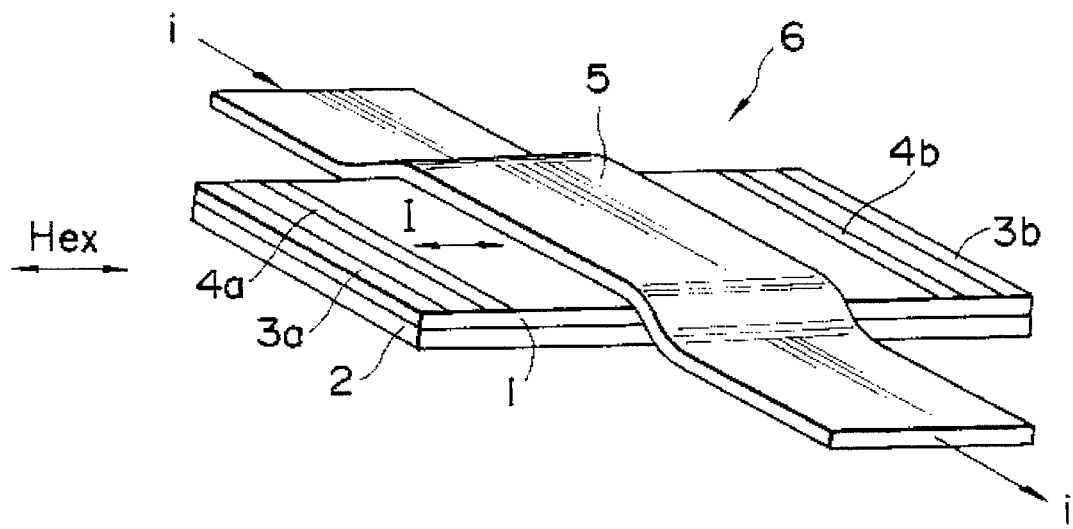
FIG. 9 is a perspective view of assistance in explaining the conceptional design of a magnetic head embodying the present invention.
Figure 10:
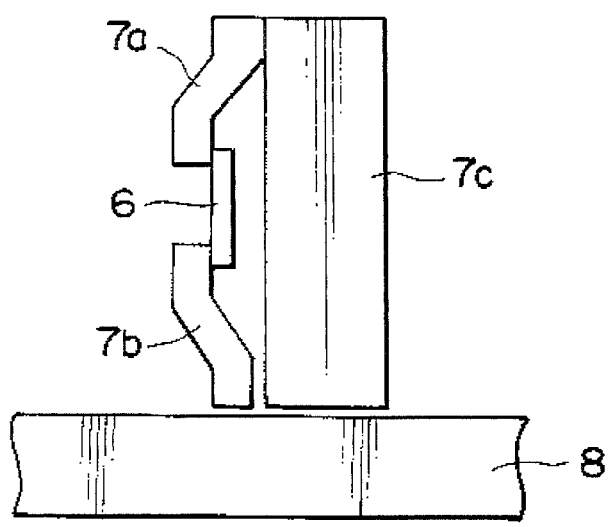
FIG. 10 is a side view of a magnetic head embodying the present invention.

Referring to FIG. 9, the magnetic head embodying the present invention has a magnetic pickup element 6 having a conductor 5 which creates a bias magnetic field HB. The conductor 5 is extended along a direction perpendicular to the direction of flow of the high-frequency current I and is insulated from the soft magnetic thin film 1. A current i is supplied to the conductor 5 to create the bias magnetic field HB. As shown in FIG. 10, the magnetic pickup element 6 is combined with yokes 7a and 7b to construct the magnetic head of a construction similar to a conventional MR head of the yoke type. A magnetic field created by a magnetic recording medium 8 acts through the gap between the yokes 7b and 7c, and through the yokes 7a, 7b and 7c and the magnetic pickup element 6 to vary the impedance Z of the soft magnetic thin film 1. The variation of the potential difference between the voltage terminals 4a and 4b (FIG. 9), due to the variation of the impedance Z, is detected for reading magnetic signals.

The construction of the magnetic head will be described in more detail with reference to FIG. 11.

Figure 11:
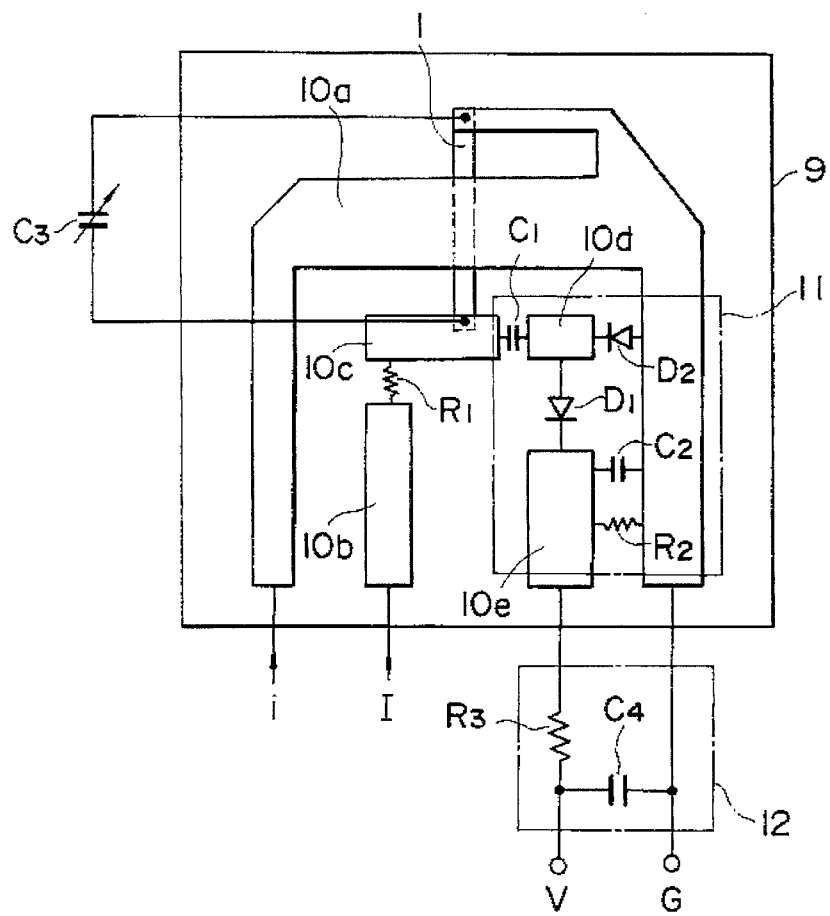
FIG. 11 is a plan view of a magnetic head embodying the present invention.

Shown in FIG. 11 are a base plate 9, wiring conductors 10a to 10e, resistors $R_1$, $R_2$ and $R_3$, capacitors $C_1$, $C_2$ and $C_4$, a variable capacitor $C_3$, Schottky diodes $D_1$, and $D_2$, an output terminal V, and a ground terminal G. The resistors $R_1$ and $R_2$, the capacitors $C_1$, and $C_2$, and the Schottky diodes $D_1$, and $D_2$ constitute an AM detector 11. A FM detector may be employed instead of the AM detector 11. The variable capacitor $C_3$ is mounted on the base plate 9.

A current i for creating a bias magnetic field HB flows through the wiring conductor 10a to the ground terminal G, a high-frequency current I flows through the wiring conductor 10b, the resistor $R_1$, the wiring conductor 10c, the soft magnetic thin film 1 and the wiring conductor 10a to the ground terminal G. An output voltage that appears at the output terminal V corresponds to the variable potential difference between the opposite ends of the soft magnetic thin film 1 with respect to the direction of flow of the high-frequency current I. The resistor $R_3$ and the capacitor $C_4$ constitute a low-pass filter 12 which attenuates the high-frequency components of the output voltage.

Figure 12:
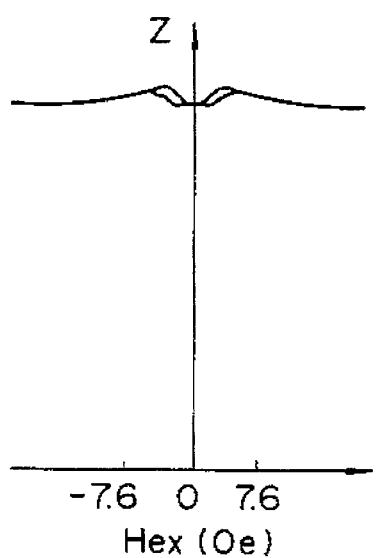
FIG. 12 is a graph showing the dependence of the impedance of a soft magnetic thin film employed in a magnetic head embodying the present invention on an external magnetic field.

FIG. 12 shows the dependence of the impedance Z of the soft magnetic thin film 1 on the intensity of the external magnetic field.

Thus, the magnetic head embodying the present invention is capable of reading recorded magnetic signals at a sensitivity higher than that of the conventional MR head, and is, like the conventional MR head, simple in construction.

The soft magnetic thin film 1 may be formed of any suitable material other than amorphous $CO_{75}Ta_{11}Zr_{14}$.

Although the invention has been described in its preferred form with a certain degree of particularity, obviously many changes and variations are possible therein. It is therefore to be understood that the present invention may be practiced otherwise than as specifically described herein without departing from the scope and spirit thereof.

It will be apparent that various modifications and/or additions may be made in the apparatus of the invention without departing from the essential feature of novelty involved, which are intended to be defined and secured by the appended claims.

What is claimed is:

1. A magnetic head comprising:

a substrate;

a soft magnetic thin film formed on the substrate; two current terminals attached to said soft magnetic thin film; two voltage terminals attached to said soft magnetic thin film; and high-frequency current supply means connected to said current terminals to supply a high-frequency current to said soft magnetic thin film;

wherein the variation of the potential difference between said voltage terminals attached to said soft magnetic thin film is detected while said high-frequency current is flows through the soft magnetic thin film.

2. The magnetic head according to claim 1, in which said soft magnetic thin film is an annealed amorphous thin film composed of Co, Ta and Zr.

3. A magnetic head according to claim 1, wherein the magnetic head is held between yokes to form a closed magnetic path through said yokes.

4. A magnetic head according to claim 1, including bias magnetic field creating means for applying a bias magnetic field to said soft magnetic thin film.

5. A magnetic head according to claim 1, including a bias magnetic field creating conductor extended over said soft magnetic thin film along a direction perpendicular to the direction of flow of the high-frequency current through said soft magnetic thin film to apply a bias magnetic field to said soft magnetic thin film.

6. The magnetic head according to claim 1 in which said high-frequency current supply means supplies a current at a frequency of about 10 MHz to said soft magnetic thin film.

7. The magnetic head according to claim 1, including means for exposing said soft magnetic thin film to an external magnetic field, whereby said potential difference varies in response to said external magnetic field.

8. The magnetic head according to claim 7, wherein said means for exposing said soft magnetic thin film to an external magnetic field comprises means for placing said soft magnetic thin film in proximity to a magnetic recording medium upon which a magnetic signal is recorded.

9. The magnetic head according to claim 7, wherein said means for exposing said soft magnetic thin film to an external magnetic field comprises means for placing said soft magnetic thin film in proximity to a magnetic recording medium upon which a magnetic signal is recorded, said magnetic recording medium having a signal recorded thereon at a frequency of up to 1 MHz.

10. A magnetic head according to claim 1, including means for supporting said head at a position adjacent movable record media for developing an output signal responsive to a signal recorded on said media, and said high-frequency current supply means producing a current with a frequency approximately equal to between five and ten times the frequency of said output signal.

11. A magnetic head according to claim 10, in which said output signal has a frequency of 1 MHz or more and said high-frequency current has a frequency of approximately 10 MHz.

12. The magnetic head according to claim 2, in which said soft magnetic thin film is produced by a process including a step in which the film is annealed by heating the same to 340° C. for thirty minutes in rotating magnetic field having a intensity of 1 KOe.

* * * * *